(12) United States Patent
Höring

(10) Patent No.: US 11,579,121 B2
(45) Date of Patent: Feb. 14, 2023

(54) METHOD AND DEVICE FOR DETERMINING THE PRESTRESS FORCE OF A CONNECTION COMPONENT

(71) Applicant: intellifast GmbH, Speyer (DE)

(72) Inventor: Gert Höring, Karlsruhe (DE)

(73) Assignee: intellifast GmbH, Speyer (DE)

( * ) Notice: Subject to any disclaimer, the term of this patent is extended or adjusted under 35 U.S.C. 154(b) by 568 days.

(21) Appl. No.: 16/701,732

(22) Filed: Dec. 3, 2019

(65) Prior Publication Data

US 2020/0173963 A1 Jun. 4, 2020

(30) Foreign Application Priority Data

Dec. 4, 2018 (DE) .......................... 102018220915.4

(51) Int. Cl.
*G01N 29/07* (2006.01)
*G01N 29/44* (2006.01)

(52) U.S. Cl.
CPC .......... *G01N 29/07* (2013.01); *G01N 29/4436* (2013.01); *G01N 2291/011* (2013.01);
(Continued)

(58) Field of Classification Search
CPC ..... G01L 5/246; B25B 23/1456; G01N 29/07; G01N 29/4436; G01N 2291/02827; G01N 2291/02881; G01N 2291/044
See application file for complete search history.

(56) References Cited

U.S. PATENT DOCUMENTS 3,969,810 A * 7/1976 Pagano ............... B25B 23/1456
73/761
4,602,511 A * 7/1986 Holt ........................ G01N 29/07
73/581

(Continued)

FOREIGN PATENT DOCUMENTS

| CN | 109844518 A | * | 6/2019 | ............. E21D 21/00 |
| WO | WO-9711343 A1 | * | 3/1997 | ............. G01L 1/255 |
| WO | WO-2018032106 A1 | * | 2/2018 | ............. E21D 21/00 |

*Primary Examiner* — Catherine T. Rastovski
*Assistant Examiner* — Kaleria Knox
(74) *Attorney, Agent, or Firm* — Dority & Manning, P.A.

(57) ABSTRACT

A method for determining the prestress force of a connection component (10) is proposed. In the method, ultrasonic signals (22) are introduced into the connection component (10) and ultrasonic echoes (24) of the ultrasonic signals (22) are received again. The method comprises the following steps:
a) introducing a longitudinal ultrasonic signal and determining a first signal time of flight $FTOF_L$ of the longitudinal ultrasonic signal until the reception of an echo of the longitudinal ultrasonic signal,
b) introducing a transverse ultrasonic signal and determining a second signal time of flight $FTOF_T$ of the transverse ultrasonic signal until the reception of an echo of the transverse ultrasonic signal, and
c) determining an effective temperature $T_{eff}$ and the prestress force of the connection component (10) on the basis of the first signal time of flight $FTOF_L$, the second signal time of flight $FTOF_T$, previously determined reference data and calibration factors using the assumption that a prestress force $F_L$ ascertained using the first signal time of flight $FTOF_L$ and a prestress force $F_T$ ascertained using the second signal time of flight $FTOF_T$ are equal in magnitude,
wherein steps a) and b) are carried out successively in any desired order or in parallel.

(Continued)

A further aspect of the invention relates to a device for carrying out the method.

8 Claims, 2 Drawing Sheets

(52) U.S. Cl.
CPC .............. *G01N 2291/02827* (2013.01); *G01N 2291/02881* (2013.01); *G01N 2291/044* (2013.01)

(56) References Cited

U.S. PATENT DOCUMENTS

| | | | | |
|---|---|---|---|---|
| 2006/0137463 | A1* | 6/2006 | Nassar | G01L 5/246 73/761 |
| 2013/0333441 | A1* | 12/2013 | Smith | G01N 29/07 73/1.82 |
| 2018/0328797 | A1* | 11/2018 | Gwon | B25B 23/14 |

* cited by examiner

METHOD AND DEVICE FOR DETERMINING THE PRESTRESS FORCE OF A CONNECTION COMPONENT

The invention relates to a method for determining the prestress force of a connection component, wherein ultrasonic signals are introduced into a connection component and echoes of the ultrasonic signals are received again. A further aspect of the invention relates to a device for carrying out the method.

Mechanical connection components, such as, e.g. screws or bolts, are checked with regard to their prestress force in a simple manner by means of ultrasonic measurement methods. For this purpose, the signal time of flight of ultrasonic waves that are coupled into the connection component and coupled out again as echo signal is measured. The ultrasonic pulses used for excitation can be both signals having a fixed frequency and signals composed of various frequency components. In the course of advances in materials sciences in recent years, a large number of composites and graded materials and special alloys have been introduced which can be used to manufacture connection components, such as bolts or screws, the material properties of which place more stringent demands on a measurement method for determining the prestress force.

What is problematic about the known ultrasound-based measurement methods for the prestress force is that the measurements are based on a determination of a time of flight of an ultrasonic signal within the connection component, wherein the measured time of flight within the connection component is also dependent on temperature. The reason for this is the thermal expansion of the material of the connection component.

For a correct measurement of the prestress force by means of ultrasound, the measured time of flight therefore has to be corrected in respect of that component which is caused by the thermal expansion of the connection component. One possibility is to convert each measured time of flight and to relate it to a defined temperature level, e.g. 0° or 20° C. room temperature. That is more or less as though measurement were always effected at the same temperature. This process is referred to as temperature compensation. This necessitates determining the temperature as accurately as possible by means of a temperature sensor at or in direct proximity to the connection component. Accurately determining the temperature of the connection component is difficult, however, particularly when checking connection components which have already been installed in a device.

Using a temperature sensor, it is possible to ascertain the temperature at a specific location of the connection component. However, the connection component often has a temperature gradient, which is not exactly determinable with a temperature sensor. Since the ultrasonic signals traverse the entire connection component from a first end to a second end during the measurement, the time of flight of the ultrasonic signals is dependent on an effective temperature of the connection component, which constitutes an averaged temperature over the entire region traversed by the ultrasonic signals. Said effective temperature cannot be determined by way of a temperature sensor since the latter can only ever ascertain the temperature at one point of the connection component.

There is thus a need for an improved measurement method which reduces temperature-dictated measurement errors in ultrasound-based measurements of the prestress force of a connection component.

U.S. Pat. No. 4,602,511 discloses a method for determining a prestress force of a fastening element which involves determining the signal times of flight of longitudinal and transverse ultrasonic waves. From the signal time of flight of the longitudinal ultrasonic wave, the signal time of flight of the transverse ultrasonic wave, material constants and reference values for the sound velocity for a non-loaded fastening element, it is possible to determine the prestress force without prior measurement of the signal times of flight in the non-loaded state.

What is disadvantageous about the known methods is that temperature compensation which takes account of the effective temperature of a component is not carried out.

DISCLOSURE OF THE INVENTION

A method for determining the prestress force of a connection component is proposed. In the method, ultrasonic signals are introduced into the connection component and ultrasonic echoes of the ultrasonic signals are received again. The method comprises the following steps:

a) introducing a longitudinal ultrasonic signal and determining a first signal time of flight $FTOF_L$ of the longitudinal ultrasonic signal until the reception of an echo of the longitudinal ultrasonic signal, b) introducing a transverse ultrasonic signal and determining a second signal time of flight $FTOF_T$ of the transverse ultrasonic signal until the reception of an echo of the transverse ultrasonic signal, and c) determining an effective temperature $T_{eff}$ and the prestress force of the connection component on the basis of the first signal time of flight $FTOF_L$, the second signal time of flight $FTOF_T$, previously determined reference data and calibration factors using the assumption that a prestress force $F_L$ ascertained using the first signal time of flight $FTOF_L$ and a prestress force $F_T$ ascertained using the second signal time of flight $FTOF_T$ are equal in magnitude, wherein steps a) and b) are carried out successively in any desired order or in parallel.

If the measurements of the first signal time of flight $FTOF_L$ and the second signal time of flight $FTOF_T$ are not carried out simultaneously, then they are preferably carried out successively within a narrow time frame. Within a narrow time frame is understood here to mean that the time which elapses between the measurement of one signal time of flight and the measurement of the respective other signal time of flight is preferably less than 10 seconds and particularly preferably less than one second.

The method presented here is intended to demonstrate a way of how it is possible to dispense with temperature compensation using a separately measured temperature by means of the preferably simultaneous measurement of longitudinal and transverse signal times of flight. In order to describe the method, it is necessary to explain the determination of the prestress force by means of ultrasound in greater detail.

A connection component is usually an elongate component having a first and a second end. One example of a typical connection component is a screw having a screw head and a screw shaft. A first end is situated at the screw head and a second end of the connection component is situated at the shaft. The screw shaft usually exhibits a thread, by way of which the screw can be connected to another component.

One possibility for determining the prestress force in connection components is the pulse echo method. An ultrasonic transducer fitted on one of the connection component ends is excited to oscillate with the aid of an electrical pulse. In the case of a screw, the ultrasonic transducer is preferably arranged on the screw head. However, an arrangement at the shaft of the screw is also possible. The coupling of the transducer to the surface of the screw has the effect that ultrasonic waves enter the connection component and traverse the latter. A portion of the ultrasonic waves is reflected at the opposite end of the screw and returns to the transducer. An echo signal can be detected there after a time period ΔT. ΔT is the time duration between the pulse excitation and the reception of the echo. As an alternative to such a measurement using reflection geometry, it is conceivable to arrange a transmitter for ultrasonic signals at the first end of the connection component and a receiver for ultrasonic signals at the opposite second end of the connection component. In this way it is possible to carry out a measurement using transmission geometry.

The time of flight of the ultrasonic waves along the axis of the connection component exhibits a distinct dependence on the applied tensile stress as a result of the screwing process. The increase in the measured ultrasound time of flight under load is governed firstly by the elongation of the connection component and also by the reduction of the ultrasound velocity in the regions of the connection component which are under mechanical stress. Both effects work in the same direction and are approximately linear.

The dependence of the prestress force on the measured times of flight can be ascertained empirically in a load cell or a tension machine and can be described by a low-order polynomial (linear or quadratic):

$$F = k_1 \cdot \Delta TOF = k_1 \cdot (FTOF - BTOF) \text{ (linear approach)} \quad \text{Equation 1}$$

$$F = k_1 \cdot \Delta TOF + k_2 \cdot \Delta TOF^2 \text{ (quadratic approach)} \quad \text{Equation 2}$$

where
F prestress force [kN]
ΔTOF time of flight difference [ns]
BTOF time of flight in the unstressed state [ns]
FTOF time of flight under load [ns]
$k_1$, $k_2$ material- and connection-component-dependent force calibration factors Preference is given to determining a time of flight of a longitudinal ultrasonic signal in the unstressed state as first reference time of flight $BTOF_L$ and a time of flight of a transverse ultrasonic signal in the unstressed state as second reference time of flight $BTOF_T$ and using them as reference data.

The force calibration factors $k_1$ and $k_2$ are dependent for example on the material and the geometry of the connection component. Preference is given to determining the force calibration factors $k_1$ and $k_2$ both for longitudinal and for transverse ultrasonic signals beforehand at a plurality of connection components. The force calibration factors $k_1$ and $k_2$ are preferably used as part of the calibration factors.

One possibility for carrying out the temperature compensation of the measured times of flight using a first-order polynomial is described in Equation 3:

$$TOF_{corr} = \frac{TOF}{(1 + c_1 \cdot T_{eff})} \quad \text{Equation 3}$$

This formula is sufficiently accurate for short connection components and small temperature ranges. For long connection components and extended temperature ranges, a second-order polynomial is recommendable (Equation 4).

$$TOF_{corr} = \frac{TOF}{\left(1 + c_1 \cdot T_{eff} + c_2 \cdot T_{eff}^2\right)} \quad \text{Equation 4}$$

where
TOF measured time of flight [ns]
$TOF_{corr}$ time of flight corrected (converted) to 0° Celsius [ns]
$T_{eff}$ effective temperature of the screw during the time of flight measurement [° C.]
$C_1$, $C_2$ material- and connection-component-dependent temperature calibration factors The temperature calibration factors $C_1$ and $C_2$ are dependent in particular on the material of the connection component and can be determined in a simple manner by measuring the ultrasound times of flight of a connection component in a climate chamber at various temperature levels, e.g. from −20 to 80° C. in 10K steps. $C_1$ and $C_2$ can be calculated from the ascertained curve of temperature versus time of flight. Preference is given to determining the temperature calibration factors $C_1$ and $C_2$ beforehand on a non-loaded connection component both for longitudinal and for transverse ultrasonic signals. The temperature calibration factors $C_1$ and $C_2$ are preferably used as part of the calibration factors.

An explanation will be given below of how it is possible to determine the prestress force of connection components with inhomogeneous temperature distribution. In practice, the user can generally have recourse to ultrasonic transducers that can excite either longitudinal or else transverse wavefronts. Special transducers exist, moreover, which can generate both longitudinal and shear waves simultaneously. One example thereof is the thin-film transducers from Intellifast (Permanent Mounted Transducers, PMT system).

Equation 2 describes in a general form the ascertainment of the prestress force F by way of the measurement of the times of flight in a connection component. If the user is enabled to excite both longitudinal and transverse wavefronts by way of said user's ultrasonic transducers, said user can ascertain the prestress force either by way of the times of flight of the longitudinal ultrasonic echoes (Equation 5) or else by way of those of the transverse echo reflections (Equation 6).

$$F_L = k_{1L} \cdot \Delta TOF_{L_{corr}} + k_{2L} \cdot (\Delta TOF_{L_{corr}})^2 \quad \text{Equation 5}$$

$$F_T = k_{1T} \cdot \Delta TOF_{T_{corr}} + k_{2T} \cdot (\Delta TOF_{T_{corr}})^2 \quad \text{Equation 6}$$

All of the measured times of flight have to be converted for the temperature compensation. Using Equation 4 as an approach for the temperature compensation, Equation 7 results for the change in the time of flight $\Delta TOF_{corr}$.

$$\Delta TOF_{corr} = \frac{FTOF}{\left(1 + c_1 \cdot T_{FTOF} + c_2 \cdot T_{FTOF}^2\right)} - \frac{BTOF}{\left(1 + c_1 \cdot T_{BTOF} + c_2 \cdot T_{BTOF}^2\right)} \quad \text{Equation 7}$$

where
$T_{FTOF}$ temperature during the measurement in the loaded state
$T_{BTOF}$ temperature during the measurement in the unstressed state If the right-hand expression from Equation 7 is inserted into Equations 5 and 6, Equations 8 (longitudinal) and 9 (transverse) are obtained, which make it possible to calculate the prestress force from the measured times of flight and the associated temperature values.

Equation 8
$$F_L = k_{1L} \cdot \left( \frac{FTOF_L}{1 + c_{1L} \cdot T_{FTOF_L} + c_{2L} \cdot T_{FTOF_L}^2} - \frac{BTOF_L}{1 + c_{1L} \cdot B_{FTOF_L} + c_{2L} \cdot B_{FTOF_L}^2} \right) +$$
$$k_{2L} \cdot \left( \frac{FTOF_L}{1 + c_{1L} \cdot T_{FTOF_L} + c_{2L} \cdot T_{FTOF_L}^2} - \frac{BTOF_L}{1 + c_{1L} \cdot T_{FTOF_L} + c_{2L} \cdot T_{FTOF_L}^2} \right)^2$$

Equation 9
$$F_T = k_{1T} \cdot \left( \frac{FTOF_T}{1 + c_{1T} \cdot T_{FTOF_T} + c_{2T} \cdot T_{FTOF_T}^2} - \frac{BTOF_T}{1 + c_{1T} \cdot T_{BTOF_T} + c_{2T} \cdot T_{BTOF_T}^2} \right) +$$
$$k_{2T} \cdot \left( \frac{FTOF_T}{1 + c_{1T} \cdot T_{FTOF_T} + c_{2T} \cdot T_{FTOF_T}^2} - \frac{BTOF_T}{1 + c_{1T} \cdot T_{BTOF_T} + c_{2T} \cdot T_{BTOF_T}^2} \right)^2$$

If the times of flight for the longitudinal and transverse echo signals are measured simultaneously or successively within a narrow time frame, the force value ascertained from the longitudinal times of flight must correspond to the numerical value that results from the measurement of the transverse times of flight (Equation 10).

$$F_L = F_T \qquad \text{Equation 10}$$

If it is furthermore assumed that the null times of flight $BTOF_L$ and $BTOF_T$ were likewise determined simultaneously, the temperatures $T_{BTOFL}$ and $T_{BTOFT}$ must likewise be equal ($T_{BTOF}$). Use of Equation 10 yields the following formula.

Equation 11
$$k_{1L} \cdot \left( \frac{FTOF_L}{1 + c_{1L} \cdot T_{\text{eff}} + c_{2L} \cdot T_{\text{eff}}^2} - \frac{BTOF_L}{1 + c_{1L} \cdot T_{BTOF} + c_{2L} \cdot T_{BTOF}^2} \right) +$$
$$k_{2L} \cdot \left( \frac{FTOF_L}{1 + c_{1L} \cdot T_{\text{eff}} + c_{2L} \cdot T_{\text{eff}}^2} - \frac{BTOF_L}{1 + c_{1L} \cdot T_{BTOF} + c_{2L} \cdot T_{BTOF}^2} \right)^2 =$$
$$k_{1T} \cdot \left( \frac{FTOF_T}{1 + c_{1T} \cdot T_{\text{eff}} + c_{2T} \cdot T_{\text{eff}}^2} - \frac{BTOF_T}{1 + c_{1T} \cdot T_{BTOF} + c_{2T} \cdot T_{BTOF}^2} \right) +$$
$$k_{2T} \cdot \left( \frac{FTOF_T}{1 + c_{1T} \cdot T_{\text{eff}} + c_{2T} \cdot T_{\text{eff}}^2} - \frac{BTOF_T}{1 + c_{1T} \cdot T_{BTOF} + c_{2T} \cdot T_{BTOF}^2} \right)^2$$

The sole remaining variable is $T_{\text{eff}}$, the "effective" temperature at the time of the time of flight measurements under load. Rearranging Equation 11 with respect to $T_{\text{eff}}$ results in an eighth-order polynomial having real and complex solutions, which polynomial can no longer be solved simply in terms of a formula. All eight solutions can be determined numerically using Newton's method. The one real solution possible can be ascertained with little complexity by considering from Equation 11 respectively both sides of the equation as function $F_L(T_{\text{eff}})$ and $F_T(T_{\text{eff}})$. The point of intersection of both functions yields the sought force value with the associated "average" temperature value. Theoretically it is also possible for more than one real solution of Equation 11 to arise. If this is the case, the points of intersection that are not possible must be ascertained by means of a plausibility check. Force and temperature values that do not lie in the range which is possible in practice serve as a criterion for the exclusion of the respective point of intersection.

During operation in practice, the user has to measure the null times of flight (longitudinal and transverse) and the associated temperature in the unstressed state once for each connection component to be newly measured. In this case, it should be ensured that the connection component is in the steady state thermally and does not have any temperature gradients. Under load, that is to say in the stressed state of the connection component, the prestress force can be ascertained with the aid of formula 11. No further temperature measurement is required for this.

A simplified solution approach arises if a linear approach is chosen (Equations 1 and 3) both for the force calculation and for the temperature compensation. Use of these two formulae with Equation 10 results in Equation 12
$$k_{1L} \cdot \left( \frac{FTOF_L}{1 + c_L \cdot T_{\text{eff}}} - \frac{BTOF_L}{1 + c_L \cdot T_{BTOF}} \right) =$$
$$k_{1T} \cdot \left( \frac{FTOF_T}{1 + c_T \cdot T_{\text{eff}}} - \frac{BTOF_T}{1 + c_T \cdot T_{BTOF}} \right)$$

Rearranging this formula with respect to $T_{\text{eff}}$ yields a quadratic equation. One of the two solutions is the sought "effective" temperature in the connection element. The prestress force can be calculated using Equation 1 and the value for the effective temperature. This can be done using the time of flight both of the longitudinal echo and of the transverse echo.

A temperature-corrected first signal time of flight difference is given by:

$$\Delta TOF_{L_{corr}} = FTOF_L/1 + c_{1L} \cdot T_{\text{eff}} + c_{2L} \cdot T_{\text{eff}}^2 - BTOF_L/1 + c_{1L} \cdot T_{\text{eff}} + c_{2L} \cdot T_{\text{eff}}^2 \qquad \text{Equation 13}$$

A temperature-corrected second signal time of flight difference is given by:

$$\Delta TOF_{T_{corr}} = FTOF_T/1 + c_{1T} \cdot T_{\text{eff}} + c_{2L} \cdot T_{\text{eff}}^2 - BTOF_T/1 + c_{1T} \cdot T_{\text{eff}} + c_{2T} \cdot T_{\text{eff}}^2 \qquad \text{Equation 14}$$

A further aspect of the invention is to provide a device that can be used to determine the prestress force of a connection component. The device is preferably configured to carry out one of the methods described herein. Accordingly, features described in the context of the methods also apply to the device and, conversely, features described in the context of the device also apply to the methods.

The device for determining the prestress force of a connection component comprises means for introducing longitudinal ultrasonic signals and transverse ultrasonic signals at one end of the connection component, means for receiving ultrasonic echoes of the ultrasonic signals, and a control unit. In this case, the control unit is configured to carry out one of the methods described herein.

The means for introducing longitudinal ultrasonic signals and transverse ultrasonic signals comprise in particular a signal generator configured to generate electrical signals having frequencies in the ultrasonic range. Said electrical signals are preferably configured in such a way that they are suitable for the excitation of ultrasonic transducers, for example of piezoelectric ultrasonic transducers applied by vapor deposition or adhesive bonding. Furthermore, the means for introducing ultrasonic signals can comprise an amplifier. The control unit is preferably connected to the signal generator and configured to control the signal generator.

In one embodiment, the device is configured to be used with connection components comprising an integrated ultrasonic transducer. In this embodiment, the means for introducing longitudinal ultrasonic signals and transverse ultrasonic signals comprise in particular electrical contacts besides the signal genitor. In this case, the electrical contacts are configured to electrically contact the ultrasonic transducer of the connection component.

In an alternative embodiment of the device, the latter comprises an ultrasonic transducer which is temporarily couplable to a connection component in order to introduce longitudinal and transverse ultrasonic signals into the connection component.

Preferably, the same ultrasonic transducers and/or electrical contacts as those used for introducing the ultrasonic signals are used for receiving echoes of the ultrasonic signals. Furthermore, in particular an amplifier and an analog/digital converter can be provided in order to digitize the received ultrasonic signals and to communicate them to the control unit. The control unit then evaluates the received echoes in accordance with one of the methods described.

The invention furthermore provides a system comprising at least one connection element with a fixedly connected ultrasonic transducer and one of the described devices for determining the prestress force of a connection component.

Advantages of the Invention

With the method described and the device described, precise measurements of the prestress force of a connection component are possible without a separate measurement of the temperature of the connection component having to be carried out. A measurement is simplified as a result.

Furthermore, the accuracy of a measurement of the prestress force is considerably increased since a separate measurement of the temperature of the connection component merely represents a temperature at one point of said connection component, but the connection component may have a temperature gradient. Since the ultrasonic signals traverse the entire connection component from a first end to a second end during the measurement, the time of flight of the ultrasonic signals is dependent on an effective temperature of the connection component, which represents an average temperature over the entire region traversed by the ultrasonic signals. Said effective temperature is ascertained and advantageously taken into account in the determination of the prestress force by means of the method according to the invention.

BRIEF DESCRIPTION OF THE FIGURES

Exemplary embodiments of the invention are illustrated in the drawings and are explained in greater detail in the description below. In the figures.

In the following description of the exemplary embodiments of the invention, identical component parts and elements are denoted by identical reference signs, a repeated description of these component parts or elements in individual cases being dispensed with. The figures merely schematically illustrate the subject matter of the invention.

Figure 1:
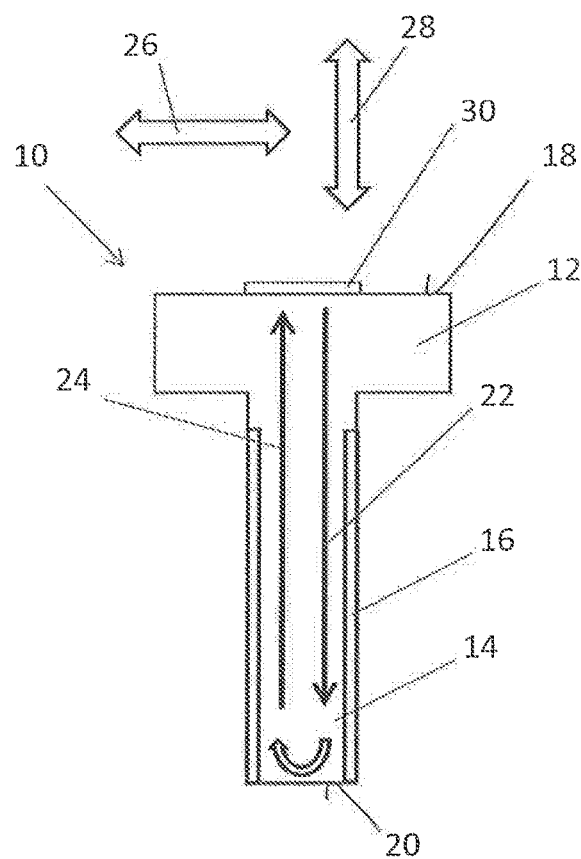
FIG. 1 shows a schematic illustration of a connection component with an ultrasonic transducer.

FIG. 1 schematically shows a connection component 10. In the illustration in FIG. 1, the connection component 10 is configured as a screw having a screw head 12 and a screw shaft 14. The screw shaft 14 has a thread 16.

The connection component 10 has a first end 18, representing the side of the screw having the screw head 12. The connection component 10 furthermore has a second end 20 on the opposite side at the screw shaft 14.

An ultrasonic transducer 30 is arranged in the center of the surface of the screw head 12, that is to say at the first end 18. The ultrasonic transducer 30, which is embodied for example as a piezoelectric element, is configured to couple ultrasonic signals 22 into the connection component 10 and to receive again ultrasonic echoes 24 reflected at the second end 20 of the connection component 10. In this case, the ultrasonic transducer 30 is arranged and configured such that it can couple in both longitudinal ultrasonic waves 28 and transverse ultrasonic waves 26. The ultrasonic transducer 30 can be embodied using thin-film technology, or else as an interconnection of at least one longitudinal and one transverse adhesively bonded piezo element, which are preferably connected in parallel or else in series (as a stack).

Handheld transducers operated in parallel and embodied respectively as longitudinal and transverse versions are usable as an alternative to a connection component 10 with an integrated ultrasonic transducer 30.

Furthermore, as an alternative to the solution shown in FIG. 1, it is possible to arrange an additional receiver for ultrasonic echoes at the second end 20 of the connection component 10, such that measurement can be effected using transmission geometry.

Figure 2:
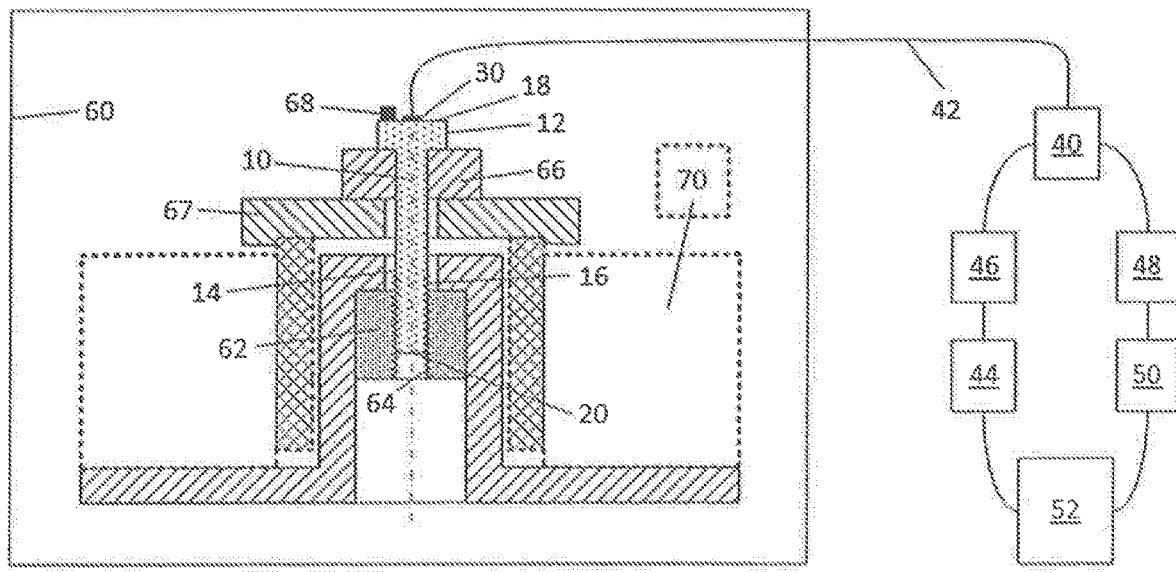
FIG. 2 shows a schematic illustration of an arrangement for measuring a prestress force of a connection component.

FIG. 2 schematically shows an arrangement for measuring a prestress force of a connection component 10. In the exemplary arrangement, a connection component 10 configured as a screw has been screwed into a screw block 62 having an internal thread 64. The screw block 62 is positioned in the interior of a load cell 70. The load cell 70 serves as a reference for the prestress force of the connection component 10. The desired clamping length is set by way of a spacer 66 and a head plate 67.

The measurement of the prestress force by means of ultrasound is coordinated by a control unit 52. The latter drives a signal generator 44, which generates an excitation signal. Said excitation signal is amplified by way of an amplifier 46 and guided via a splitter 40 and a connecting line 42 to the ultrasonic transducer 30 situated at the first end 18 of the connection component 10. On account of the excitation by the electrical signals obtained, the ultrasonic transducer 30 introduces ultrasonic waves into the connection component 10, with the result that longitudinal and transverse ultrasonic waves 26, 28, cf. FIG. 1, reach the second end 20 through the screw shaft 14. At the second end 20, the ultrasonic waves are reflected and return as ultrasonic echoes 24, cf. FIG. 1, to the ultrasonic transducer 30 once again through the screw shaft 14. The ultrasonic transducer 30 receives the ultrasonic echoes 24 and converts them into an electrical signal, which passes back to the splitter 40 via the connecting line 42. The splitter 40 guides the received signals via a reception amplifier 48 to a receiver 50, where the signals are digitized and transmitted to the control unit 52 for evaluation.

The control unit 52 determines in each case the signal times of flight for the longitudinal and transverse ultrasonic signals. This is done by evaluating in each case how much time has elapsed between the generation of an excitation signal and the reception of the digitized echo signal.

In the non-loaded state of the connection component 10, it is necessary to measure the signal times of flight for the longitudinal and the transverse ultrasonic waves as reference time of flight and the associated temperature once and to store them in the control unit 52. These three constants and the signal times of flight for the longitudinal and the transverse ultrasonic waves under load make it possible to calculate the prestress force without direct measurement of the temperature by means of a temperature sensor 68. The prestress force and the associated "effective" temperature of the connection component 10 can be calculated using Equation 11.

In order to be able to test the ascertainment of the prestress force of the connection component 10 at various temperatures, a temperature chamber 60 is provided, which accommodates the connection component 10, screwed into a load cell 70 with screw block 62, spacer 66 and head plate 67. Furthermore, for comparison purposes, a temperature sensor 68 is arranged at the screw head 12 of the connection component 10.

The load cell 70 allows an accurate determination of the prestress force for comparison purposes by means of direct measurement of the force acting on the load cell 70. The temperature sensor 68 is used to make it possible to compare a conventional temperature compensation with the effective temperature determined according to the invention.

Figure 3:
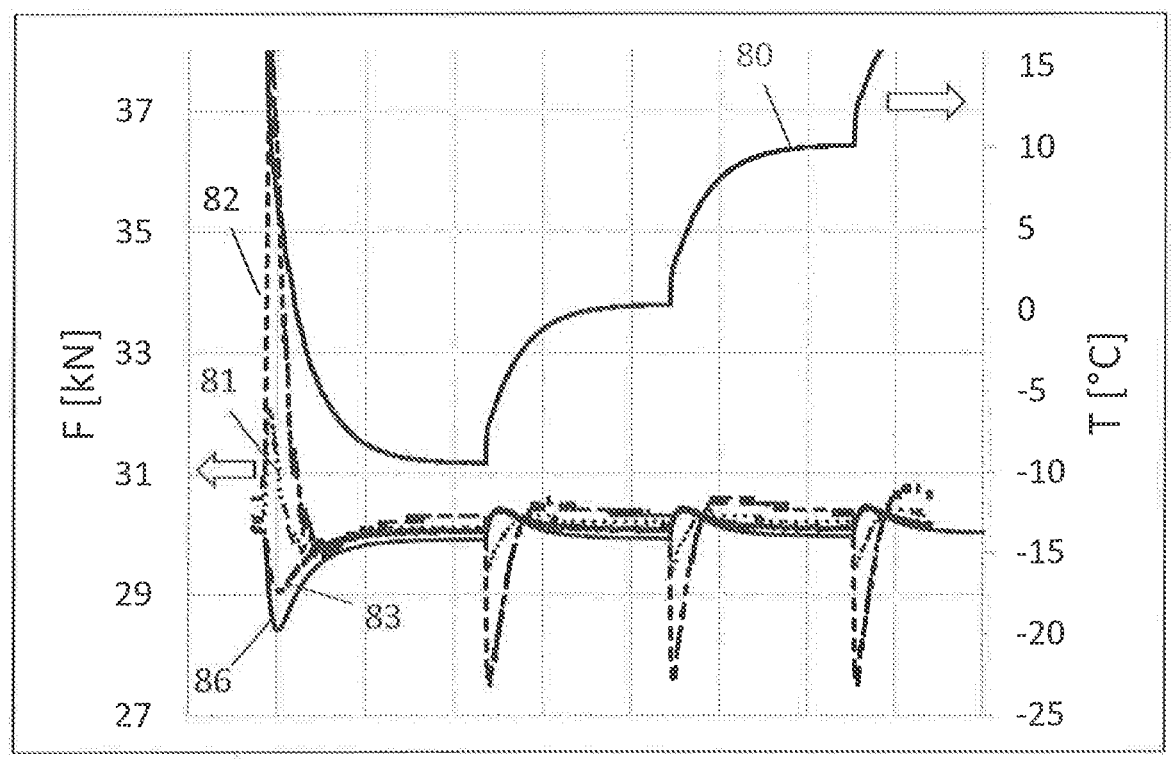
FIG. 3 shows a measurement series carried out using the experimental arrangement from FIG. 2.

The diagram in FIG. 3 shows a measurement series carried out using the experimental arrangement from FIG. 2, which measurement series involved investigating a measurement of the prestress force of a screw as securing element under changing temperature conditions. Time is plotted on the X-axis of the diagram. The determined prestress force in kN is plotted on the left-hand Y-axis and the temperature T in ° C. measured by the temperature sensor 68 at the securing element 10 is plotted on the right-hand Y-axis. The time profile of the prestress force in the case of temperature changes from −10° C. to +10° C. was investigated in the measurement series illustrated.

The temperature within the temperature chamber 60 was changed repeatedly. In a first step, the desired temperature was set to −10° C. The curve 80 shows the measurement values of the temperature sensor 68. In the diagram in FIG. 3 it is evident that the temperature T which was ascertained by the temperature sensor 68 at the screw head 12 initially falls rapidly and then slowly approaches the desired value. After a first waiting time had elapsed, the desired temperature was subsequently set to 0° C. The measured temperature T in turn initially rose rapidly and then slowly approached the desired value. After a second waiting time, the desired value was set to 10° C. The measured temperature T once again initially rose rapidly and then slowly approached the desired value. After a third waiting time, the temperature regulation of the temperature chamber 60 was switched off, with the result that the temperature rose to approach room temperature.

The curve 86 in FIG. 3 illustrates the reference prestress force ascertained by the load cell 70. It is evident here that a temperature change led in each case to a temporary change in the prestress force. The initial cooling to −10° C. proceeding from room temperature led to a temporary reduction in the prestress force. For each of the subsequent temperature steps in which the temperature in the temperature chamber 60 was increased, a temporary increase in the prestress force is discernable. The temporary change in the prestress force is attributable to the fact that, in the event of temperature change, the mechanical component parts involved, such as the screw block 62, the spacer 66 and the connection component 10 itself, heat up and cool down at different rates. In this regard, all the component parts of the experiment set-up were at room temperature level at the beginning of the test. The subsequent cooling down to −10° C. encompassed firstly the outer component parts such as the spacer 66. The connection component 10 seated in the interior of the experimental arrangement required the most time to assume the temperature of −10° C. The momentary reduction of the prestress force in the experimental arrangement can be explained by the faster shrinkage of the spacer 66 compared with the connection component 10. Conversely, each further temperature increase by in each case 10K in the temperature chamber leads to a momentary increase in the prestress force since the spacer 66 heats up and expands more rapidly than the connection component 10 seated in the interior.

The three further curves 81, 82 and 83 in the diagram in FIG. 3 show in each case the prestress force of the connection component 10 determined on the basis of ultrasound measurements. The first curve 81 shows a first prestress force, for which only the longitudinal ultrasonic signals were taken into account, and the second curve 82 shows a second prestress force, for which only the transverse ultrasonic signals were taken into account. In order to carry out a temperature compensation, recourse was had to the temperature ascertained by the temperature sensor 68.

In the illustration in FIG. 3, it is clearly evident that the prestress force respectively determined only by way of the longitudinal or transverse ultrasonic signals, in the case of a variation of the temperature, indicates an opposite variation in comparison with the reference prestress force determined by way of the load cell.

This stems from the fact that the temperature of the connection component, in particular shortly after the beginning of a temperature change, is not uniform and lags behind the temperature of the temperature chamber 60. The value of the temperature T ascertained by the temperature sensor 68 is thus not representative of the entire connection component 10. The effective temperature $T_{eff}$ of the connection component 10, which is a temperate of the connection component 10 which is averaged over the signal propagation distance of the ultrasonic signals, deviates here distinctly from the temperature T ascertained by way of the temperature sensor 68.

A third curve 83 shows a third prestress force, which was determined taking account of the longitudinal and the transverse ultrasonic signals. In this case, the effective temperature $T_{eff}$ of the connection component was determined and taken into account for a temperature compensation. In the case of the temperature changes carried out, the third prestress force follows the reference prestress force determined by way of the load cell 70 with only slight deviations.

LIST OF REFERENCE SIGNS

10 Connection component
12 Screw head
14 Screw shaft
16 Thread
18 First end
20 Second end
22 Ultrasonic signal
24 Ultrasonic echo
26 Transverse wave
28 Longitudinal wave
30 Ultrasonic transducer
40 Splitter
42 Connecting line
44 Signal generator
46 Transmission amplifier 48 Reception amplifier
50 Receiver
52 Control unit
60 Temperature chamber
62 Screw block
64 Internal thread
66 Spacer
67 Head plate
68 Temperature sensor
70 Load cell
80 Temperature curve
81 First curve
82 Second curve
83 Third curve
86 Prestress force

The invention claimed is:

1. A method for determining the prestress force of a connection component, wherein ultrasonic signals are introduced into the connection component and ultrasonic echoes of the ultrasonic signals are received again, comprising the following steps:
   a) introducing a longitudinal ultrasonic signal and determining a first signal time of flight $FTOF_L$ of the longitudinal ultrasonic signal until the reception of an echo of the longitudinal ultrasonic signal,
   b) introducing a transverse ultrasonic signal and determining a second signal time of flight $FTOF_T$ of the transverse ultrasonic signal until the reception of an echo of the transverse ultrasonic signal, and
   c) determining an effective temperature $T_{\textit{eff}}$ and the prestress force of the connection component on the basis of the first signal time of flight $FTOF_L$, the second signal time of flight $FTOF_T$, previously determined reference data, and calibration factors, using the assumption that a prestress force $F_L$ ascertained using the first signal time of flight $FTOF_L$ and a prestress force $F_T$ ascertained using the second signal time of flight $FTOF_T$ are equal in magnitude,
   wherein steps a) and b) are carried out successively in any desired order or in parallel, wherein the calibration factors describe an empirically ascertained relationship between prestress force and a change in a signal time of flight, and/or wherein the calibration factors describe an empirically ascertained temperature dependence of the time of flight of a non-loaded connection element, wherein a quadratic temperature compensation of a first and/or a second signal time of flight difference is performed, wherein a temperature-corrected first signal time of flight difference is given by $$\Delta TOF_{L_{corr}} = \frac{FTOF_L}{1 + c_{1L} \cdot T_{\textit{eff}} + c_{2L} \cdot T_{\textit{eff}}^2} - \frac{BTOF_L}{1 + c_{1L} \cdot T_{\textit{eff}} + c_{2L} \cdot T_{\textit{eff}}^2}$$

and a temperature-corrected second signal time of flight difference is given by $$\Delta TOF_{T_{corr}} = \frac{FTOF_T}{1 + c_{1T} \cdot T_{\textit{eff}} + c_{2T} \cdot T_{\textit{eff}}^2} - \frac{BTOF_T}{1 + c_{1T} \cdot T_{\textit{eff}} + c_{2T} \cdot T_{\textit{eff}}^2},$$

wherein $C_{1L}$, $C_{1T}$, $C_{2L}$ and $C_{2T}$ are empirically ascertained constants, wherein $BTOF_L$ is a first reference time of flight and $BTOF_T$ is a second reference time of flight.

2. The method as claimed in claim 1, wherein the previously determined reference data comprise a first reference time of flight $BTOF_L$ of the longitudinal ultrasonic signal and a second reference time of flight $BTOF_T$ of the transverse ultrasonic signal, which were ascertained at a reference temperature $T_{BTOF}$.

3. The method as claimed in claim 1, wherein a linear temperature compensation of a first and a second signal time of flight difference is performed, wherein a temperature-corrected first signal time of flight difference is given by $$\Delta TOF_{L_{corr}} = \frac{FTOF_L}{1 + c_{1L} \cdot T_{\textit{eff}}} - \frac{BTOF_L}{1 + c_{1L} \cdot T_{\textit{eff}}}$$

and a temperature-corrected second signal time of flight difference is given by $$\Delta TOF_{T_{corr}} = \frac{FTOF_T}{1 + c_{1T} \cdot T_{\textit{eff}}} - \frac{BTOF_T}{1 + c_{1T} \cdot T_{\textit{eff}}},$$

wherein $C_L$ and $C_T$ are empirically ascertained constants.

4. The method as claimed in claim 1, wherein a linear relationship between prestress force and a signal time of flight difference is assumed, wherein the prestress force $F_L$ ascertained by way of the first signal time of flight is given by $F_L = k_L \cdot \Delta TOF_{L_{corr}}$ and the prestress force $F_T$ ascertained by way of the second signal time of flight is given by $F_T = k_T \cdot \Delta TOF_{T_{corr}}$, wherein $k_L$ and $k_T$ are empirically determined material constants.

5. The method as claimed in claim 1, wherein the effective temperature T is given by equating $F_T$ and $F_L$ and solving the resulting quadratic equation with respect to $T_{\textit{eff}}$.

6. The method as claimed in claim 1, wherein a quadratic relationship between prestress force and a signal time of flight difference is assumed, wherein the prestress force $F_L$ ascertained by way of the first signal time of flight is given by $F_L = k_{1L} \cdot \Delta TOF_{L_{corr}} + k_{2L} \cdot (\Delta TOF_{L_{corr}})^2$ and the prestress force $F_T$ ascertained by way of the second signal time of flight is given by $F_T = k_{1T} \cdot \Delta TOF_{T_{corr}} + k_{2T} \cdot (\Delta TOF_{T_{corr}})_2$, wherein $k_{1L}$, $k_{2L}$, $k_{1T}$ and $k_{2T}$ are empirically determined constants.

7. The method as claimed in claim 1, wherein the effective temperature $T_{\textit{eff}}$ is given by equating $F_T$ and $F_L$ and numerically seeking solutions to the equation for $T_{\textit{eff}}$.

8. A device for determining the prestress force of a connection component comprising means for introducing longitudinal ultrasonic signals and transverse ultrasonic signals into the connection component, means for receiving ultrasonic echoes of the ultrasonic signals, and a control unit, wherein the control unit is configured to carry out one of the methods as claimed in claim 1.

* * * * *